United States Patent
Fukuda et al.

(10) Patent No.: US 10,110,014 B2
(45) Date of Patent: Oct. 23, 2018

(54) POWER SUPPLY SYSTEM FOR OUTBOARD MOTOR, OUTBOARD MOTOR BOAT, AND OUTBOARD MOTOR

(71) Applicant: YAMAHA HATSUDOKI KABUSHIKI KAISHA, Iwata-shi, Shizuoka-ken (JP)

(72) Inventors: Shiro Fukuda, Iwata (JP); Kazuyuki Umiguchi, Iwata (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 378 days.

(21) Appl. No.: 14/953,115

(22) Filed: Nov. 27, 2015

(65) Prior Publication Data
US 2016/0218518 A1 Jul. 28, 2016

(30) Foreign Application Priority Data
Jan. 28, 2015 (JP) ................................. 2015-014048

(51) Int. Cl.
*B60L 1/00* (2006.01)
*H02J 5/00* (2016.01)
*B63H 20/00* (2006.01)
*H02J 1/06* (2006.01)
*H02J 1/00* (2006.01)

(52) U.S. Cl.
CPC .................. *H02J 5/00* (2013.01); *H02J 1/06* (2013.01); *B63H 20/00* (2013.01); *H02J 2001/008* (2013.01)

(58) Field of Classification Search
CPC .......... H02J 5/00; H02J 1/06; H02J 2001/008; B63H 20/00
USPC .................................................. 307/9.1, 10.1
See application file for complete search history.

(56) References Cited

U.S. PATENT DOCUMENTS
5,681,193 A 10/1997 Pham et al.

FOREIGN PATENT DOCUMENTS
JP H09-39895 A 2/1997
JP 2001-128388 A 5/2001

*Primary Examiner* — Hal Kaplan
(74) *Attorney, Agent, or Firm* — Rabin & Berdo, P.C.

(57) ABSTRACT

A power supply system for an outboard motor includes a first terminal configured to supply electric power converted by a converting device to an engine accessory and to be capable of supplying the electric power to a portion external to an engine cover and a second terminal branched from a branch portion between the converting device and the engine accessory, configured to be capable of supplying the electric power to a portion external to the engine cover at a voltage higher than the voltage of the first terminal.

15 Claims, 6 Drawing Sheets

FIG. 2 FIRST EMBODIMENT

FIG.3 SECOND EMBODIMENT

FIG.5 FIRST MODIFICATION

POWER SUPPLY SYSTEM FOR OUTBOARD MOTOR, OUTBOARD MOTOR BOAT, AND OUTBOARD MOTOR

CROSS-REFERENCE TO RELATED APPLICATION

The priority application number JP2015-014048, Power Supply System for Outboard Motor, Outboard Motor Boat, and Outboard Motor, Jan. 28, 2015, Shiro Fukuda and Kazuyuki Umiguchi, upon which this patent application is based is hereby incorporated by reference.

BACKGROUND OF THE INVENTION

Field of the Invention

The present invention relates to a power supply system for an outboard motor, an outboard motor boat, and an outboard motor.

Description of the Background Art

A power supply system for an outboard motor is known in general. Such a power supply system for an outboard motor is disclosed in U.S. Pat. No. 5,681,193 and Japanese Patent Laying-Open No. 2001-128388, for example.

The aforementioned U.S. Pat. No. 5,681,193 discloses a marine propulsion device (a power supply system for an outboard motor) including an engine, an alternator that generates a first alternating-current voltage and a second alternating-current voltage, and a rectifier/regulator that transforms the first alternating-current voltage and the second alternating-current voltage into a first direct-current voltage required by an engine accessory and a second direct-current voltage required by a battery, respectively.

The aforementioned Japanese Patent Laying-Open No. 2001-128388 discloses a charging system for a small boat (a power supply system for an outboard motor) including an engine, a power generator driven by rotation of the engine, a propeller battery and an accessory battery charged with electric power output from the power generator, and a regulator that regulates the electric power output from the power generator. In this charging system for a small boat according to Japanese Patent Laying-Open No. 2001-128388, the propeller battery and the accessory battery are powered by a common voltage regulated by the regulator.

In a power supply system for the conventional marine propulsion device described in the aforementioned U.S. Pat. No. 5,681,193, a voltage is transformed into a prescribed direct-current voltage required by the battery through the rectifier/regulator. When the power consumption of an electrical component is increased so that a required power generation amount is increased, therefore, it is necessary to increase a current due to the constant voltage in order to increase electric power of transmission. In other words, the voltage is restricted by a battery voltage during electric power transmission. In this case, it is difficult to make the current larger than a current transmittable according to the diameter of a transmission line and transmit more electric power.

In the charging system for a small boat according to the aforementioned Japanese Patent Laying-Open No. 2001-128388, the regulator supplies electric power of a common regulated voltage to the propeller battery and the accessory battery. Also in the charging system for a small boat according to the aforementioned Japanese Patent Laying-Open No. 2001-128388, a voltage is restricted by a battery voltage during electric power transmission, similarly to in the power supply system for the marine propulsion device described in the aforementioned U.S. Pat. No. 5,681,193, and hence it may be difficult to transmit more electric power. In order to transmit more electric power, the diameter of a transmission line is conceivably increased. If the diameter of the transmission line is increased, however, the volume and weight of the transmission line is increased. In general, thus, a power supply system for an outboard motor, an outboard motor boat, and an outboard motor each enabling an increase in electric power of transmission while significantly reducing or preventing an increase in the diameter of the transmission line are desired.

SUMMARY OF THE INVENTION

The present invention has been proposed in order to solve the aforementioned problems, and an object of the present invention is to provide a power supply system for an outboard motor, an outboard motor boat, and an outboard motor each enabling an increase in electric power of transmission while significantly reducing or preventing an increase in the diameter of a transmission line.

A power supply system for an outboard motor according to a first aspect of the present invention includes an engine including a crankshaft, a power generator including a stator and a rotor driven by the crankshaft, an engine accessory configured to drive the engine, a converting device configured to convert alternating-current power output from the power generator into direct-current power, an engine cover configured to cover the engine, the power generator, the engine accessory, and the converting device, a first terminal configured to supply electric power converted by the converting device to the engine accessory and to be capable of supplying the electric power to a portion external to the engine cover, and a second terminal branched from a branch portion between the converting device and the engine accessory, configured to be capable of supplying the electric power to a portion external to the engine cover at a voltage higher than the voltage of the first terminal.

As hereinabove described, the power supply system for an outboard motor according to the first aspect is provided with the second terminal capable of supplying the electric power to the portion external to the engine cover at the voltage higher than the voltage of the first terminal, whereby more electric power can be supplied from the second terminal without increasing the current. Thus, the electric power of transmission can be increased while an increase in the diameter of a transmission line is significantly reduced or prevented. The current of the electric power of transmission is not increased, and hence an electric power transmission loss caused by the resistance of the transmission line can be significantly reduced or prevented. In other words, Joule heat generated by the resistance is proportional to the square of the current, and hence an increase in the current of the electric power of transmission is significantly reduced or prevented so that the electric power transmission loss can be effectively significantly reduced or prevented. Consequently, more electric power can be efficiently transmitted.

The aforementioned power supply system for an outboard motor according to the first aspect preferably further includes a first step-down transformer arranged between the branch portion and the engine accessory, and the voltage of the branch portion is an engine accessory voltage or higher.

According to this structure, the electric power of transmission supplied from the second terminal can be increased while electric power of a proper voltage is supplied to the engine accessory.

In this case, the converting device is preferably configured to output the direct-current power of the engine accessory voltage or higher. According to this structure, the voltage of the electric power supplied to the second terminal can be easily increased while the electric power of the proper voltage is supplied to the engine accessory.

In the aforementioned structure in which the first step-down transformer is provided between the branch portion and the engine accessory, the power generator is preferably configured to output the alternating-current power of the engine accessory voltage or higher. According to this structure, the voltage of the electric power output from the converting device can be easily increased by increasing the voltage of the electric power supplied to the converting device.

In the aforementioned structure in which the first step-down transformer is provided between the branch portion and the engine accessory, the converting device is preferably configured to perform field control of the power generator. According to this structure, the voltage of the direct-current power output from the converting device can be efficiently increased by performing the field control of the power generator. Furthermore, electric power can be efficiently generated by performing the field control of the power generator even when the number of rotations of the engine is small or large.

The aforementioned structure in which the first step-down transformer is provided between the branch portion and the engine accessory preferably further includes a first step-up transformer arranged between the converting device and the branch portion. According to this structure, the voltage of the electric power supplied to the second terminal can be reliably increased by increasing the voltage of the electric power supplied to the branch portion even when the number of rotations of the engine is small and an induced voltage is small.

In the aforementioned power supply system for an outboard motor according to the first aspect, the first terminal is preferably connected to an engine battery arranged in a boat body provided with the outboard motor. According to this structure, electric power is supplied from the first terminal to the engine battery, and hence the engine battery can be efficiently charged.

In the aforementioned power supply system for an outboard motor according to the first aspect, the engine accessory preferably includes at least one of an injector, a starter motor, an engine control unit, and a spark plug. According to this structure, the electric power supplied to the first terminal is supplied to the engine accessory including at least one of the injector, the starter motor, the engine control unit, and the spark plug, and hence the engine accessory can be driven.

In the aforementioned power supply system for an outboard motor according to the first aspect, the power generator, the engine accessory, and the converting device are preferably mounted on the engine. According to this structure, increases in a transmission distance of drive force between the engine and the power generator and a transmission distance of drive force between the engine and the engine accessory or an increase in a transmission distance of electric power between the power generator and the converting device can be significantly reduced or prevented, and hence the drive force or the electric power can be efficiently transmitted.

The aforementioned power supply system for an outboard motor according to the first aspect preferably further includes a second step-up transformer arranged between the branch portion and the second terminal. According to this structure, the voltage of the electric power supplied to the second terminal can be reliably increased even when the number of rotations of the engine is small and the induced voltage is small.

In the aforementioned power supply system for an outboard motor according to the first aspect, the second terminal is preferably connected to a boat accessory battery arranged in a boat body provided with the outboard motor. According to this structure, even when the boat accessory battery requires more electric power, the second terminal can supply and transmit the required more electric power to the boat accessory battery.

In this case, the boat accessory battery is preferably configured to supply the electric power to an electrical component arranged in the boat body. According to this structure, required electric power can be supplied from the second terminal to the boat accessory battery even when the power consumption of the electrical component in the boat body is large, and hence an electric power shortage in the electrical component can be significantly reduced or prevented.

In the aforementioned structure in which the second terminal is connected to the boat accessary battery, the second terminal is preferably connected to the boat accessory battery through a second step-down transformer. According to this structure, after the second step-down transformer steps down the voltage of the direct-current power to a voltage suitable for charging the boat accessory battery, the boat accessory battery is charged. Therefore, the boat accessory battery can be charged with electric power of a proper voltage.

The aforementioned structure in which the second terminal is connected to the boat accessory battery preferably further includes a constant voltage device provided between the branch portion and the boat accessory battery, the second terminal is preferably connected to n boat accessory batteries connected in series, and the constant voltage device is preferably configured to transform the voltage of the electric power into a boat accessory battery voltage×n and to output the electric power. According to this structure, even when a plurality of boat accessory batteries are connected in series, the constant voltage device adjusts the voltage so that the boat accessory batteries can be charged with electric power of a proper voltage.

An outboard motor boat according to a second aspect of the present invention includes an outboard motor, a boat body mounted with the outboard motor, and an engine battery and a boat accessory battery both arranged in the boat body. The outboard motor includes an engine including a crankshaft, a power generator including a stator and a rotor driven by the crankshaft, an engine accessory configured to drive the engine, a converting device configured to convert alternating-current power output from the power generator into direct-current power, an engine cover configured to cover the engine, the power generator, the engine accessory, and the converting device, a first terminal configured to supply electric power converted by the converting device to the engine accessory and to be capable of supplying the electric power to the engine battery external to the engine cover, and a second terminal branched from a branch portion between the converting device and the engine accessory, configured to be capable of supplying the electric power to the boat accessory battery external to the engine cover at a voltage higher than the voltage of the first terminal.

As hereinabove described, the outboard motor boat according to the second aspect is provided with the second terminal capable of supplying the electric power to the boat accessory battery external to the engine cover at the voltage higher than the voltage of the first terminal, whereby more electric power can be supplied from the second terminal without increasing the current. Thus, the outboard motor boat enabling an increase in the electric power of transmission while significantly reducing or preventing an increase in the diameter of a transmission line can be provided. The current of the electric power of transmission is not increased, and hence an electric power transmission loss caused by the resistance of the transmission line can be significantly reduced or prevented. Consequently, more electric power can be efficiently transmitted.

An outboard motor according to a third aspect of the present invention includes an engine including a crankshaft, a power generator including a stator and a rotor driven by the crankshaft, an engine accessory configured to drive the engine, a converting device configured to convert alternating-current power output from the power generator into direct-current power, an engine cover configured to cover the engine, the power generator, the engine accessory, and the converting device, a first terminal configured to supply electric power converted by the converting device to the engine accessory and to be capable of supplying the electric power to a portion external to the engine cover, and a second terminal branched from a branch portion between the converting device and the engine accessory, configured to be capable of supplying the electric power to a portion external to the engine cover at a voltage higher than the voltage of the first terminal.

As hereinabove described, the outboard motor according to the third aspect is provided with the second terminal capable of supplying the electric power to the portion external to the engine cover at the voltage higher than the voltage of the first terminal, whereby more electric power can be supplied from the second terminal without increasing the current. Thus, the outboard motor enabling an increase in the electric power of transmission while significantly reducing or preventing an increase in the diameter of a transmission line can be provided. The current of the electric power of transmission is not increased, and hence an electric power transmission loss caused by the resistance of the transmission line can be significantly reduced or prevented. Consequently, more electric power can be efficiently transmitted.

The aforementioned outboard motor according to the third aspect preferably further includes a first step-down transformer arranged between the branch portion and the engine accessory, and the voltage of the branch portion is preferably an engine accessory voltage or higher. According to this structure, the electric power of transmission supplied from the second terminal can be increased while electric power of a proper voltage is supplied to the engine accessory.

In this case, the converting device is preferably configured to output the direct-current power of the engine accessory voltage or higher. According to this structure, the voltage of the electric power supplied to the second terminal can be easily increased while the electric power of the proper voltage is supplied to the engine accessory.

In the aforementioned outboard motor in which the first step-down transformer is provided between the branch portion and the engine accessory, the power generator is preferably configured to output the alternating-current power of the engine accessory voltage or higher. According to this structure, the voltage of the electric power output from the converting device can be easily increased by increasing the voltage of the electric power supplied to the converting device.

In the aforementioned outboard motor in which the first step-down transformer is provided between the branch portion and the engine accessory, the converting device is preferably configured to perform field control of the power generator. According to this structure, the voltage of the direct-current power output from the converting device can be efficiently increased by performing the field control of the power generator. Furthermore, electric power can be efficiently generated by performing the field control of the power generator even when the number of rotations of the engine is small or large.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment (Structure of Outboard Motor Boat)

The structure of an outboard motor boat 10 according to a first embodiment of the present invention is now described with reference to FIGS. 1 and 2. In the figure, arrow FWD represents the forward movement direction of the outboard motor boat 10, and arrow BWD represents the reverse movement direction of the outboard motor boat 10. Furthermore, in the figure, arrow R represents the starboard direction of the outboard motor boat 10, and arrow L represents the portside direction of the outboard motor boat 10.

Figure 1:
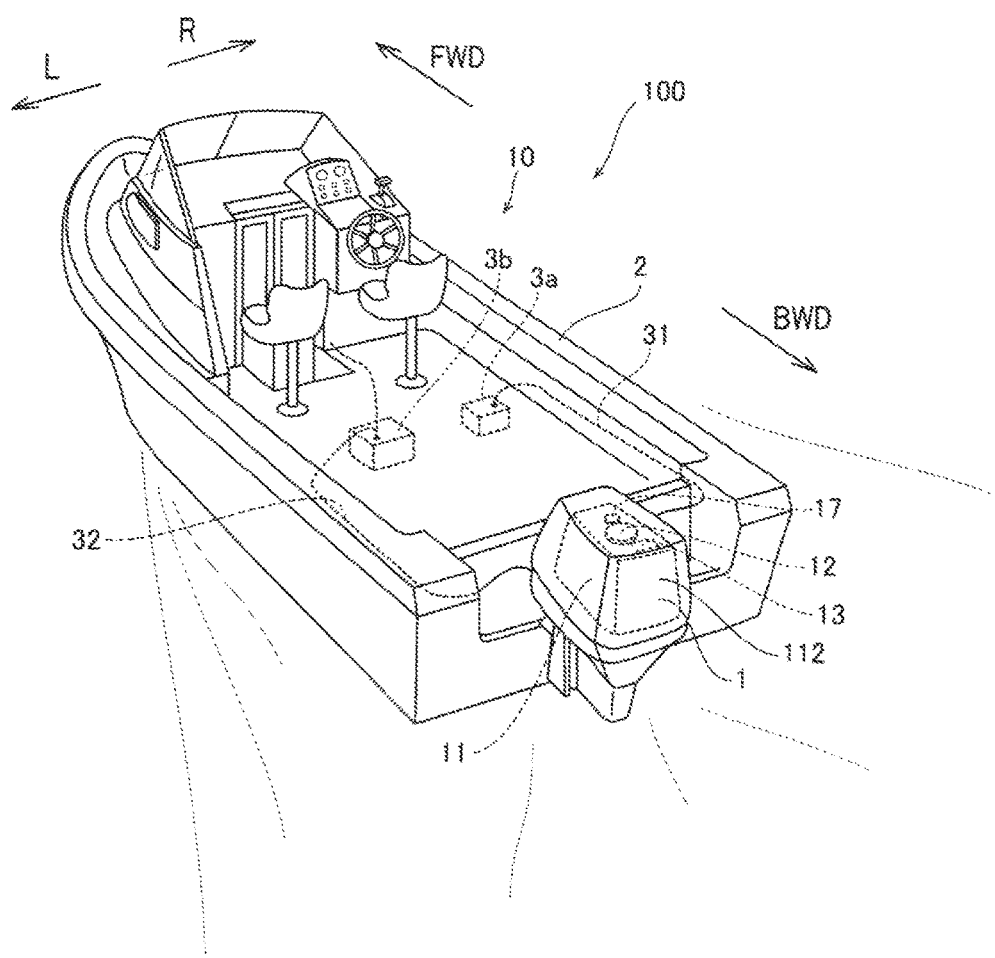
FIG. 1 is a diagram showing an outboard motor boat including a power supply system for an outboard motor according to a first embodiment of the present invention.

The outboard motor boat 10 includes an outboard motor 1, a boat body 2, an engine battery 3*a*, and a boat accessory battery 3*b*, as shown in FIG. 1. One outboard motor 1 is provided on a rear portion of the boat body 2. The engine battery 3*a* is connected to the outboard motor 1 through a cable 31. The boat accessory battery 3b is connected to the outboard motor 1 through a cable 32.

Figure 2:
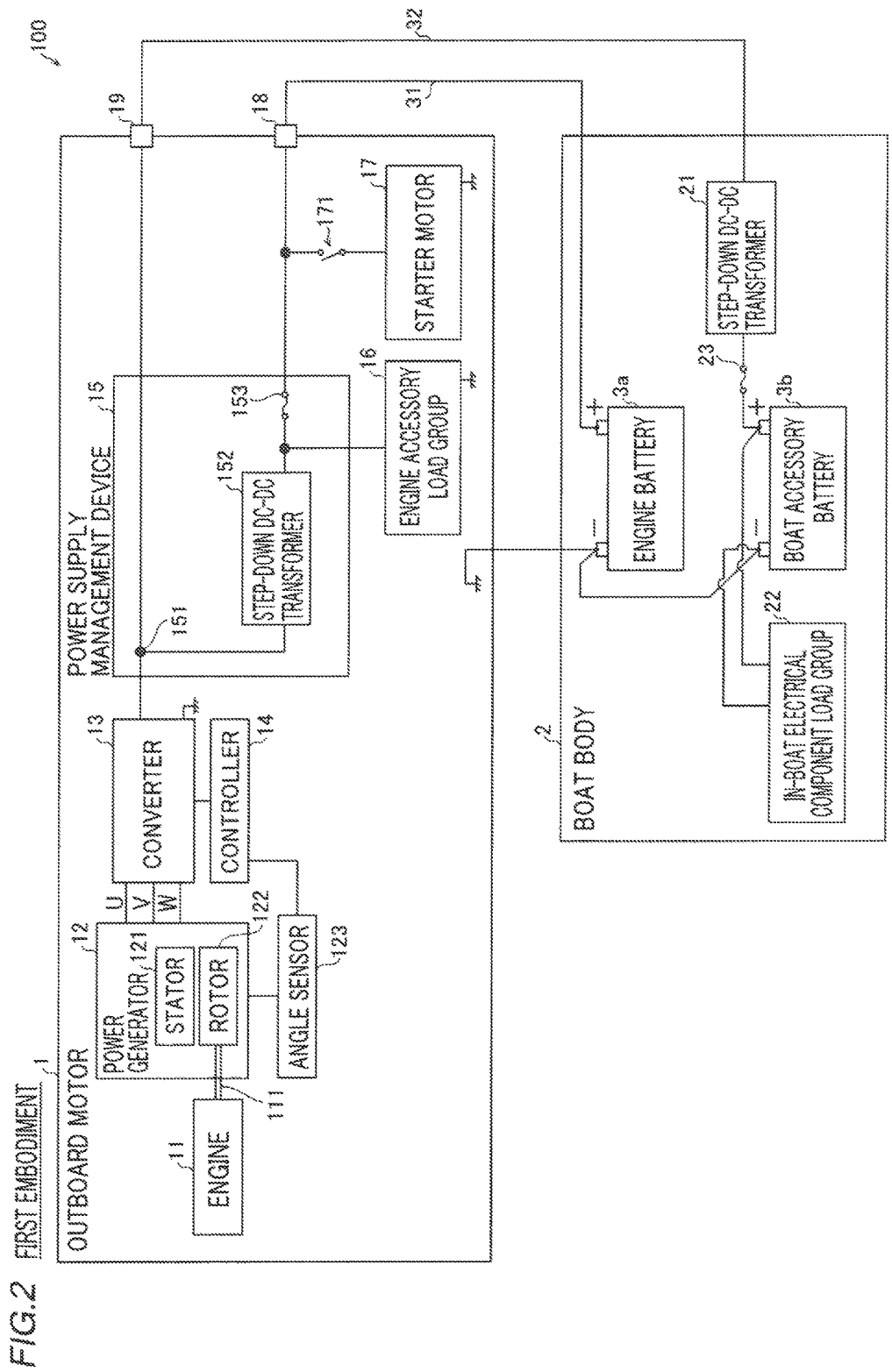
FIG. 2 is a block diagram schematically showing the power supply system for an outboard motor according to the first embodiment of the present invention.

The outboard motor 1 includes an engine 11, a power generator 12, a converter 13, a controller 14, a power supply management device 15, an engine accessory load group 16, and a starter motor 17, as shown in FIG. 2. The engine 11 includes a crankshaft 111 and an engine cover 112 (see FIG. 1). The power generator 12 includes a stator 121 and a rotor 122. The power generator 12 is provided with an angle sensor 123. The power supply management device 15 includes a branch portion 151, a step-down DC-DC transformer 152, and a fuse 153. The converter 13 is an example of the "converting device" in the present invention, and the starter motor 17 is an example of the "engine accessory" in the present invention. The step-down DC-DC transformer 152 is an example of the "first step-down transformer" in the present invention.

The outboard motor 1 is arranged to extend to below the engine 11 and further includes a drive shaft that transmits the drive force of the engine 11, one propeller shaft that extends in a direction orthogonal to (intersecting with) the drive shaft, and one propeller mounted on a rear end portion of the propeller shaft, rotated together with the propeller shaft.

The boat body 2 is provided with a step-down DC-DC transformer 21, an in-boat electrical component load group 22, and a fuse 23, as shown in FIG. 2. The step-down DC-DC transformer 21 is an example of the "second step-down transformer" in the present invention which is also a "step-down transformer located in the boat body," and the in-boat electrical component load group 22 is an example of the "electrical component" in the present invention.

A power supply system 100 for an outboard motor includes the engine 11, the power generator 12, the converter 13, the engine accessory load group 16, the starter motor 17, a first terminal 18 (which may also be part of a "first electrical path"), and a second terminal 19 (which may be part of a "second electrical path"). The engine accessory load group 16 includes devices configured to drive the engine 11, such as an injector, an engine control unit (ECU), and a spark plug. The power supply system 100 for an outboard motor is provided to supply electric power to the outboard motor boat 10. In other words, the power supply system 100 for an outboard motor generates and stores electric power used by the outboard motor boat 10, and supplies the electric power. As shown in FIG. 1, the power generator 12, the converter 13, and the starter motor 17 are mounted on the engine 11. The engine 11, the power generator 12, the converter 13, the engine accessory load group 16, and the starter motor 17 are covered with the engine cover 112.

The engine 11 rotates the crankshaft 111 to rotate the propeller of the outboard motor 1. The rotation of the propeller generates propulsion power, and the boat body 2 moves. The engine 11 rotates the crankshaft 111 to rotate the rotor 122 of the power generator 12. The rotation of the rotor 122 generates electromotive force, and the power generator 12 generates electric power. The engine 11 is powered by fuel such as gasoline or gas oil.

The power generator 12 is arranged on an upper portion of the engine 11, as shown in FIG. 1. The rotor 122 of the power generator 12 is driven by the crankshaft 111 and rotates with respect to the stator 121. As shown in FIG. 2, the power generator 12 generates alternating-current power of three phases (a U phase, a V phase, and a W phase) by the rotation of the rotor 122. The generated alternating-current power of the three phases is output to the converter 13. The power generator 12 outputs alternating-current power of an engine accessory voltage (which is defined as the driving voltage of the engine accessory load group 16 and the starter motor 17) (14 V, for example) or higher. The stator 121 includes coils. The rotor 122 includes permanent magnets. The rotor 122 also serves as a flywheel of the crankshaft 111. The angle sensor 123 detects the number of rotations (rotational speed) of the rotor 122. The detected number of rotations (rotational speed) is transmitted to the controller 14.

The converter 13 converts the alternating-current power output from the power generator 12 into direct-current power. Specifically, the converter 13 includes a plurality of switching elements. The alternating-current power of the three phases is converted into the direct-current power by switching of the plurality of switching elements. The converter 13 performs field control of the power generator 12 such that the power generator 12 efficiently generates electric power. Specifically, the converter 13 accelerates or delays the timing (phase) of the switching to perform the field control of the power generator 12. The converter 13 outputs direct-current power of a constant voltage (48 V, for example) when the power generator 12 (engine 11) rotates with a certain number of rotations or more. The converter 13 outputs direct-current power of the engine accessory voltage (the driving voltage of the engine accessory load group 16 and the starter motor 17) (14 V, for example) or higher.

The controller 14 controls the power supply system 100 for an outboard motor. Specifically, the controller 14 controls power conversion of the converter 13 and controls voltage step-down of the step-down DC-DC transformers 152 and 21. The controller 14 includes a CPU (central processing unit). The controller 14 controls the converter 13 and the step-down DC-DC transformers 152 and 21 on the basis of the number of rotations of the power generator 12 detected by the angle sensor 123, the voltage and current of the direct-current power output from the step-down DC-DC transformer 152, and the voltage and current of the direct-current power output from the step-down DC-DC transformer 21.

The controller 14 controls switching of the converter 13 such that the voltage of the direct-current power output from the converter 13 becomes the constant voltage (48 V, for example). The controller 14 controls the step-down DC-DC transformer 152 to output direct-current power of a constant voltage (14 V, for example). When the current of the direct-current power output from the step-down DC-DC transformer 152 exceeds a prescribed value, the controller 14 manipulates the duty ratio of the step-down DC-DC transformer 152 such that the electric power output from the step-down DC-DC transformer 152 becomes a necessary amount. The controller 14 controls the step-down DC-DC transformer 21 to output direct-current power of the constant voltage (14 V, for example). When the current of the direct-current power output from the step-down DC-DC transformer 21 exceeds a prescribed value, the controller 14 manipulates the duty ratio of the step-down DC-DC transformer 21 such that the electric power output from the step-down DC-DC transformer 21 becomes a necessary amount.

According to the first embodiment, the power supply management device 15 divides and outputs the direct-current power output from the converter 13 to the first terminal 18 and the second terminal 19. The first terminal 18 may be part of a first electrical path which leads to the engine accessory group 16, starter motor 17 and the boat body 2. The first electrical path may receive a modified output of the converter 13, which is described below. The second terminal 19 may be part of a second electrical path which receives an output of the converter 13 (the output may be modified according to some embodiments disclosed herein), and which is connected to the boat body 2 through the cable 32. Further, the power supply management device 15 steps down the voltage of the direct-current power output from the converter 13 and outputs the direct-current power to the first terminal 18. The power supply management device 15 outputs the direct-current power output from the converter 13 to the second terminal 19 without changing the voltage (but the voltage is slightly stepped down due to wiring resistance). In other words, the voltage (potential) of the second terminal 19 is higher than the voltage (potential) of the first terminal 18.

The branch portion 151 is arranged between the converter 13 and engine accessories (the engine accessory load group 16 and the starter motor 17). The step-down DC-DC transformer 152 is arranged between the branch portion 151 and the engine accessories (the engine accessory load group 16 and the starter motor 17). In other words, the voltage (potential) of the branch portion 151 becomes the engine accessory voltage (14 V, for example) or higher.

The step-down DC-DC transformer 152 steps down the voltage of the direct-current power branched from the branch portion 151 and outputs the direct-current power. Specifically, the step-down DC-DC transformer 152 steps down the voltage (48 V, for example) of the branch portion 151 to the engine accessory voltage (14 V, for example). The direct-current power output from the step-down DC-DC transformer 152 is supplied to the engine accessory load group 16, the starter motor 17, and the first terminal 18.

The fuse 153 is disconnected so that no current flows therethrough when a current exceeding the rating flows. The fuse 153 is arranged between the step-down DC-DC transformer 152 and the first terminal 18.

The starter motor 17 rotates the crankshaft 111 when the engine 11 is started. The starter motor 17 is connected to the first terminal 18 through a switch (contactor) 171. In other words, when the switch 171 is turned on, electric power is supplied from the engine battery 3a to the starter motor 17, and the engine 11 is started.

The first terminal 18 supplies electric power converted by the converter 13 to the engine accessories (the engine accessory load group 16 and the starter motor 17) and is capable of supplying electric power to a portion external to the engine cover 112. The first terminal 18 is connected to the engine battery 3a through the cable 31. The voltage (potential) of the first terminal 18 is the engine accessory voltage and the charging voltage of the engine battery 3a. The voltage (potential) of the first terminal 18 is 14 V, for example. The first terminal 18 may be arranged internally to the engine cover 112, externally to the engine cover 112, or on a border between a space internal to the engine cover 112 and a space external to the engine cover 112.

The second terminal 19 is capable of supplying electric power to a portion external to the engine cover 112 at a voltage higher than the voltage of the first terminal 18. The second terminal 19 is connected to the boat accessory battery 3b by the cable 32. The second terminal 19 is connected to the boat accessory battery 3b through the step-down DC-DC transformer 21 and the fuse 23. The voltage of the second terminal 19 is 48 V, for example. When the engine 11 (power generator 12) is driven with a prescribed number of rotations or more and the voltage of the electric power output from the converter 13 is the constant voltage (48 V, for example), the voltage (potential) of the second terminal 19 becomes higher than the voltage (potential) of the first terminal 18. When the engine 11 (power generator 12) is driven with less than the prescribed number of rotations and the voltage of the electric power output from the converter 13 is lower than the constant voltage (14 V, for example), on the other hands, the voltage (potential) of the second terminal 19 may become the voltage (potential) of the first terminal 18 or lower. The prescribed number of rotations denotes the number of rotations (300 rpm, for example) before reaching an idle rotational speed, for example. In other words, the average voltage of the second terminal 19 is higher than the average voltage of the first terminal 18. The second terminal 19 may be arranged internally to the engine cover 112, externally to the engine cover 112, or on a border between a space internal to the engine cover 112 and a space external to the engine cover 112.

The step-down DC-DC transformer 21 steps down the voltage of the direct-current power supplied from the second terminal 19 and outputs the direct-current power. Specifically, the step-down DC-DC transformer 21 steps down the voltage (48 V, for example) of the second terminal 19 to the charging voltage (14 V, for example) of the boat accessory battery 3b.

The in-boat electrical component load group 22 includes electrical components such as an air conditioning of a cabin, a refrigerator, a water heater, an audio instrument, and an electric light. Electric power is supplied from the boat accessory battery 3b to the in-boat electrical component load group 22. The power capacity of the boat accessory battery 3b is larger than that of the engine battery 3a. In other words, the power consumption of the in-boat electrical component load group 22 is larger than that of the engine accessories (the engine accessory load group 16 and the starter motor 17). Thus, more electric power is transmitted to the boat accessory battery 3b connected to the second terminal 19 than to the engine battery 3a connected to the first terminal 18.

The fuse 23 is disconnected so that no current flows therethrough when a current exceeding the rating flows. The fuse 23 is arranged between the step-down DC-DC transformer 21 and the boat accessory battery 3b.

The engine battery 3a is capable of supplying electric power to the engine accessory load group 16 and the starter motor 17 through the cable 31 and the first terminal 18. The battery voltage of the engine battery 3a is about 12 V, for example. The battery voltage of the boat accessory battery 3b is about 12 V, for example.

Effects of First Embodiment

According to the first embodiment, the following effects are obtained.

According to the first embodiment, as hereinabove described, the power supply system 100 for an outboard motor is provided with the second terminal 19 capable of supplying electric power to the portion external to the engine cover 112 at the voltage higher than the voltage of the first terminal 18, whereby more electric power can be supplied from the second terminal 19 without increasing the current. Thus, the electric power of transmission can be increased while an increase in the diameter of the cable 32 (transmission line) is significantly reduced or prevented. The current of the electric power of transmission is not increased, and hence an electric power transmission loss caused by the resistance of the cable 32 can be effectively significantly reduced or prevented. Consequently, more electric power can be efficiently transmitted.

According to the first embodiment, as hereinabove described, the step-down DC-DC transformer 152 is arranged between the branch portion 151 and both the engine accessory load group 16 and the starter motor 17 and steps down the voltage of the branch portion 151 to the engine accessory voltage or higher. Thus, the electric power of transmission supplied from the second terminal 19 can be increased while electric power of a proper voltage is supplied to the engine accessory load group 16 and the starter motor 17.

According to the first embodiment, as hereinabove described, the converter 13 outputs the direct-current power of the engine accessory voltage or higher. Thus, the voltage of the electric power supplied to the second terminal 19 can be easily increased while the electric power of the proper voltage is supplied to the engine accessory load group 16 and the starter motor 17.

According to the first embodiment, as hereinabove described, the power generator 12 outputs the alternating-current power of the engine accessory voltage or higher. Thus, the voltage of the electric power output from the converter 13 can be easily increased by increasing the voltage of the electric power supplied to the converter 13.

According to the first embodiment, as hereinabove described, the converter 13 performs the field control of the power generator 12. Thus, the voltage of the direct-current power output from the converter 13 can be efficiently increased by performing the field control of the power generator 12. Furthermore, electric power can be efficiently generated by performing the field control of the power generator 12 even when the number of rotations of the engine 11 is small or large.

According to the first embodiment, as hereinabove described, the first terminal 18 is connected to the engine battery 3a arranged in the boat body 2 provided with the outboard motor 1. Thus, electric power is supplied from the first terminal 18 to the engine battery 3a, and hence the engine battery 3a can be efficiently charged.

According to the first embodiment, as hereinabove described, the power generator 12, the starter motor 17, and the converter 13 are mounted on the engine 11. Thus, increases in a transmission distance of drive force between the engine 11 and the power generator 12 and a transmission distance of drive force between the engine 11 and the starter motor 17 or an increase in a transmission distance of electric power between the power generator 12 and the converter 13 can be significantly reduced or prevented, and hence the drive force or the electric power can be efficiently transmitted.

According to the first embodiment, as hereinabove described, the second terminal 19 is connected to the boat accessory battery 3b arranged in the boat body 2 provided with the outboard motor 1. Thus, even when the boat accessory battery 3b requires more electric power, the second terminal 19 can supply and transmit the required more electric power to the boat accessory battery 3b.

According to the first embodiment, as hereinabove described, the boat accessory battery 3b supplies electric power to the in-boat electrical component load group 22 arranged in the boat body 2. Thus, required electric power can be supplied from the second terminal 19 to the boat accessory battery 3b even when the power consumption of the in-boat electrical component load group 22 in the boat body 2 is large, and hence an electric power shortage in the in-boat electrical component load group 22 can be significantly reduced or prevented.

According to the first embodiment, as hereinabove described, the second terminal 19 is connected to the boat accessory battery 3b through the step-down DC-DC transformer 21. Thus, after the step-down DC-DC transformer 21 steps down the voltage of the direct-current power to a voltage suitable for charging the boat accessory battery 3b, the boat accessory battery 3b is charged. Therefore, the boat accessory battery 3b can be charged with electric power of a proper voltage.

Second Embodiment (Structure of Power Supply System for Outboard Motor)

A second embodiment of the present invention is now described with reference to FIGS. 3 and 4. In this second embodiment, the potential of a second terminal is higher than that of a branch portion, unlike the aforementioned first embodiment in which the potential of the second terminal is substantially equal to that of the branch portion. Portions similar to those of the power supply system 100 for an outboard motor according to the first embodiment are denoted by the same reference numerals.

Figure 3:
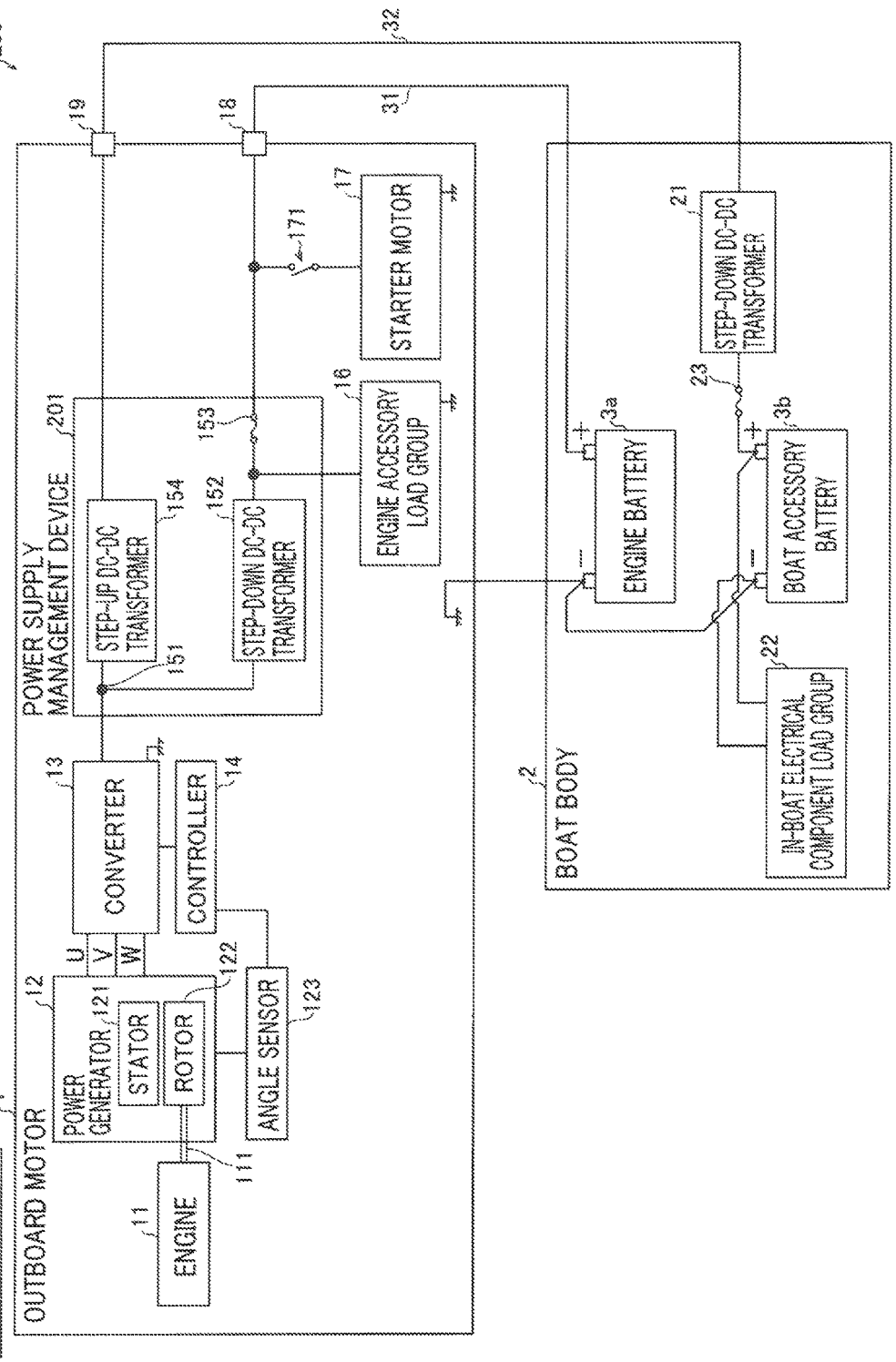
FIG. 3 is a block diagram schematically showing a power supply system for an outboard motor according to a second embodiment of the present invention.

As shown in FIG. 3, a power supply management device 201 of a power supply system 200 for an outboard motor according to the second embodiment includes a branch portion 151, a step-down DC-DC transformer 152, a fuse 153, and a step-up DC-DC transformer 154. In other words, according to the second embodiment, the step-up DC-DC transformer 154 is provided between the branch portion 151 and a second terminal 19. The step-up DC-DC transformer 154 is an example of the "second step-up transformer" or "a step-up transformer arranged between the branch portion and the second electrical path" in the present invention.

According to the second embodiment, the step-up DC-DC transformer 154 steps up direct-current power output from a converter 13 and outputs direct-current power of a constant voltage (48 V, for example). In other words, the step-up DC-DC transformer 154 steps up the direct-current power when the number of rotations of an engine 11 (power generator 12) is less than a certain number of rotations and the voltage of the direct-current power output from the converter 13 is less than the constant voltage.

Figure 4:
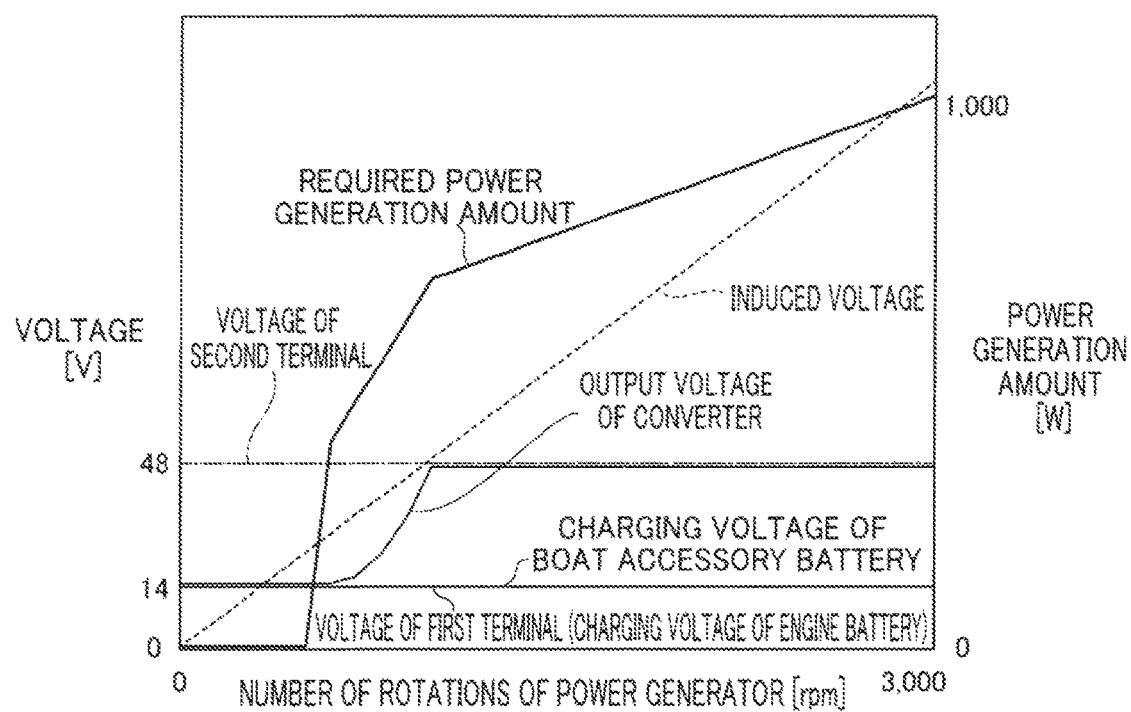
FIG. 4 is a diagram showing the voltage of a first terminal and the voltage of a second terminal in the power supply system for an outboard motor according to the second embodiment of the present invention.

When the number of rotations of the power generator 12 is less than the certain number of rotations and an induced voltage is less than a prescribed voltage (48 V), as shown in FIG. 4, the voltage of the direct-current power output from the converter 13 is smaller than 48 V. In this case, the voltage of electric power stepped up by the step-up DC-DC transformer 154 and output to the second terminal 19 becomes 48 V. The voltage of electric power output to a first terminal 18 is stepped down from the voltage of the electric power output from the converter 13 to 14 V by the step-down DC-DC transformer 152. The voltage of electric power with which an engine battery 3a is charged becomes equal to the potential of the first terminal 18, which is 14 V. The voltage of electric power with which a boat accessory battery 3b is charged becomes 14 V since the step-down DC-DC transformer 152 steps down the potential of the second terminal 19.

The remaining structure of the power supply system 200 for an outboard motor according to the second embodiment is similar to that of the power supply system 100 for an outboard motor according to the aforementioned first embodiment.

Effects of Second Embodiment

According to the second embodiment, the following effects are obtained.

According to the second embodiment, as hereinabove described, the power supply system 200 for an outboard motor is provided with the second terminal 19 capable of supplying electric power to a portion external to an engine cover 112 at a voltage higher than the voltage of the first terminal 18, similarly to the first embodiment, whereby electric power of transmission can be increased while an increase in the diameter of a cable 32 (transmission line) is significantly reduced or prevented.

According to the second embodiment, as hereinabove described, the step-up DC-DC transformer 154 is provided between the branch portion 151 and the second terminal 19. Thus, the voltage of the electric power supplied to the second terminal can be reliably increased even when the number of rotations of the engine 11 is small and the induced voltage is small.

The remaining effects of the second embodiment are similar to those of the aforementioned first embodiment.

(Modification)

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

Figure 5:
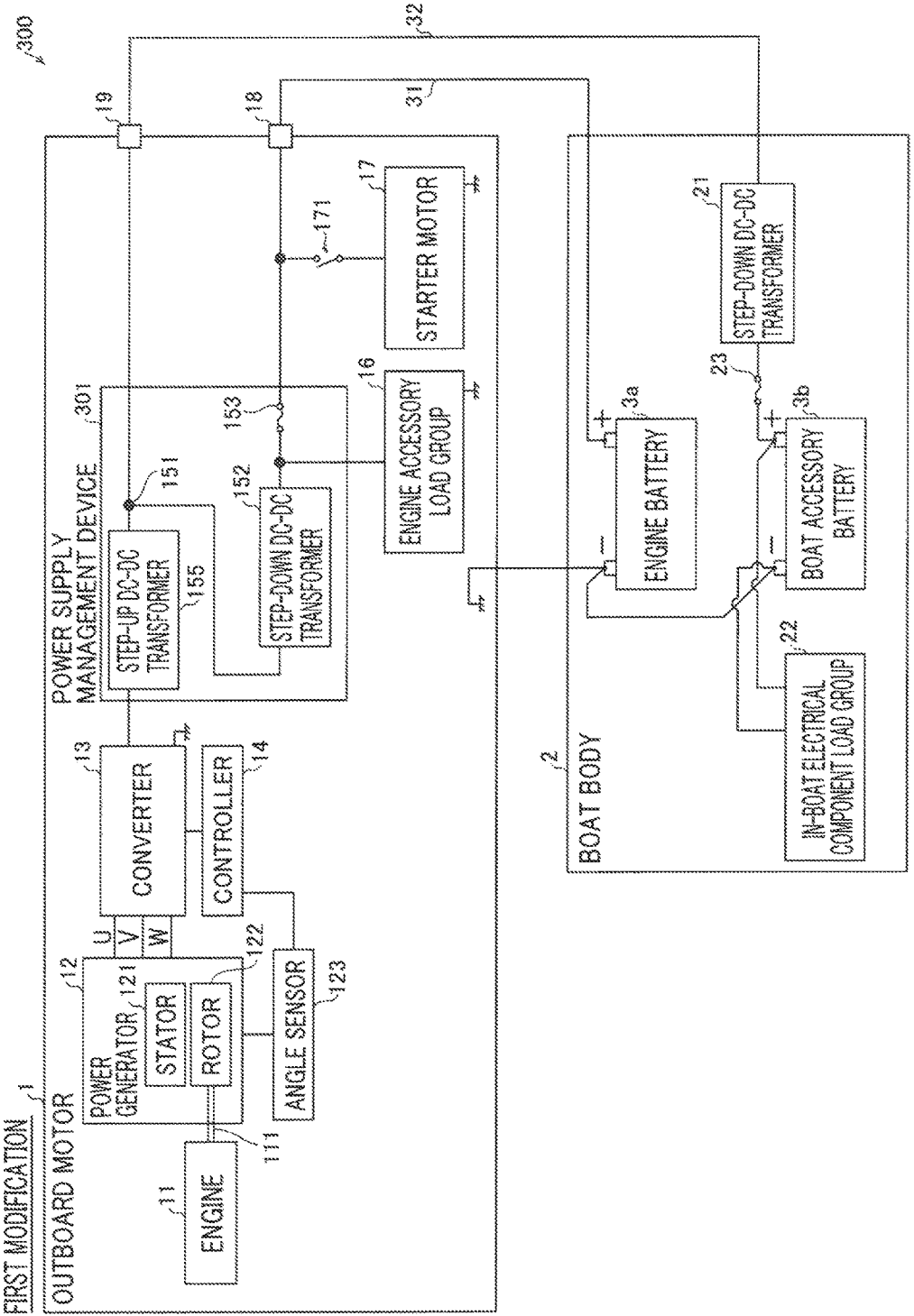
FIG. 5 is a block diagram schematically showing a power supply system for an outboard motor according to a modification (first modification) of the second embodiment of the present invention.

For example, while the step-up DC-DC transformer 154 (second step-up transformer) is provided between the branch portion 151 and the second terminal 19 in the aforementioned second embodiment, the present invention is not restricted to this. According to the present invention, as in a power supply system 300 for an outboard motor according to a first modification shown in FIG. 5, a step-up DC-DC transformer 155 may alternatively be provided between a converter 13 (converting device) and a branch portion 151 of a power supply management device 301. The step-up DC-DC transformer 155 is an example of the "first step-up transformer" or "a step-up transformer arranged between the converting device and the branch portion" in the present invention. Thus, the voltage of electric power supplied to the branch portion 151 is increased, and hence even when the number of rotations of an engine 11 is small and an induced voltage is small, the voltage of electric power supplied to a second terminal 19 can be easily increased.

Figure 6:
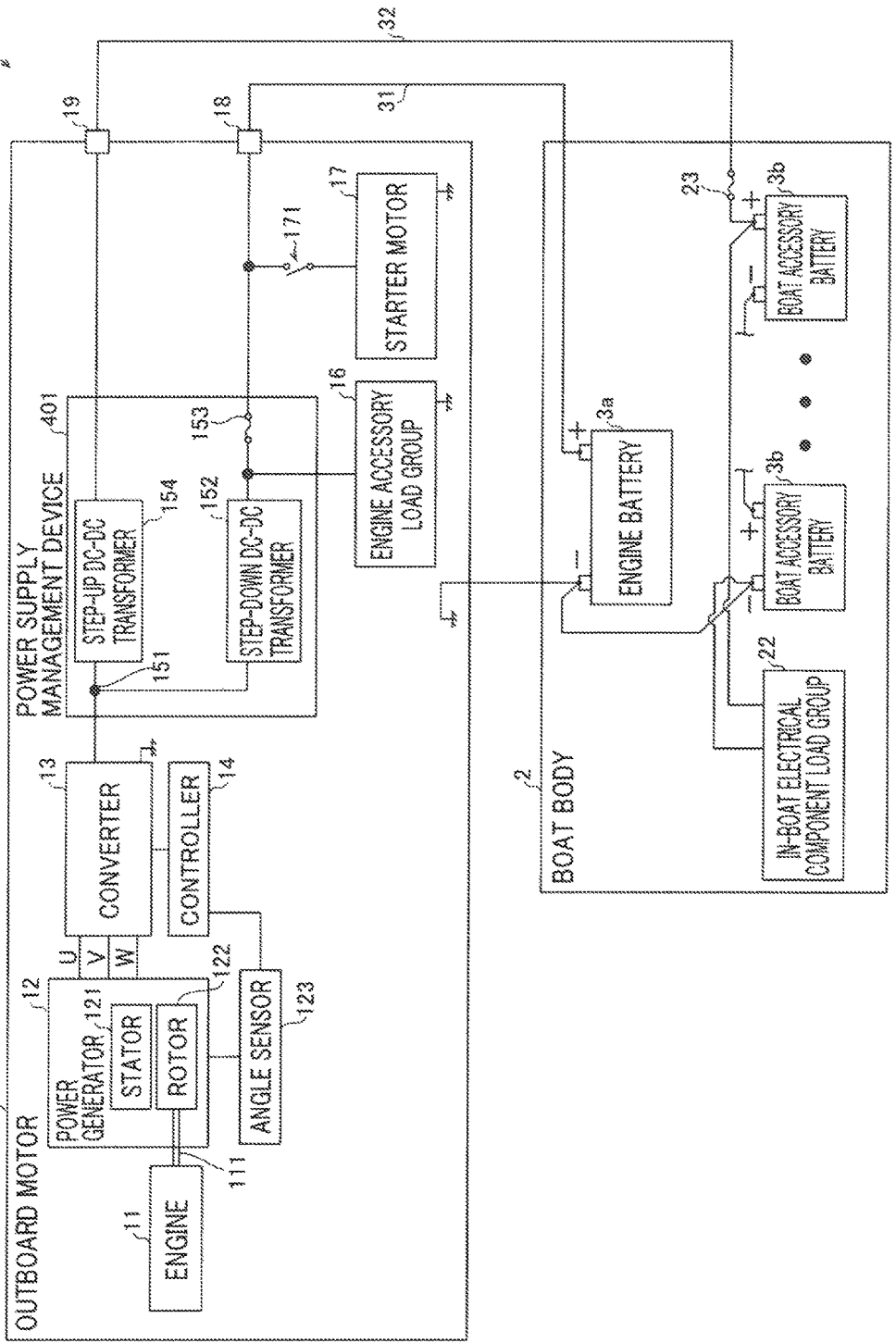
FIG. 6 is a block diagram schematically showing a power supply system for an outboard motor according to another modification (second modification) of the second embodiment of the present invention.

While the battery voltage of the boat accessory battery is substantially equal to the battery voltage of the engine battery in each of the aforementioned first and second embodiments, the present invention is not restricted to this. According to the present invention, the battery voltage of the boat accessory battery may alternatively be higher than or lower than the battery voltage of the engine battery. In the case where the voltage of the electric power supplied from the boat accessory battery is increased, a plurality of (n) boat accessory batteries 3b may be connected in series, as in a power supply system 400 for an outboard motor according to a second modification shown in FIG. 6. In this case, a step-up DC-DC transformer 154 of a power supply management device 401 may transform the voltage of electric power into a potential of the boat accessory battery voltage×n and output the electric power to a second terminal 19. The step-up DC-DC transformer 154 is an example of the "constant voltage device" in the present invention.

While one outboard motor is provided in each of the aforementioned first and second embodiments, the present invention is not restricted to this. According to the present invention, two or more outboard motors may alternatively be provided. In this case, an engine battery may be provided for each of a plurality of outboard motors.

While the converter is employed as the converting device in each of the aforementioned first and second embodiments, the present invention is not restricted to this. According to the present invention, a rectifier may alternatively be employed as the converting device.

While the voltage (potential) of the first terminal is 14 V and the voltage (potential) of the second terminal is 48 V in each of the aforementioned first and second embodiments, the present invention is not restricted to this. According to the present invention, the voltage of the first terminal may alternatively be other than 14 V, and the voltage of the second terminal may alternatively be other than 48 V, so far as the voltage of the second terminal is higher than the voltage of the first terminal. The voltage of the first terminal and the voltage of the second terminal may be properly changed by battery voltages, the amounts of charge, or the like.

While the engine accessory load group includes the injector, the starter motor, the engine control unit, and the spark plug in each of the aforementioned first and second embodiments, the present invention is not restricted to this. According to the present invention, the engine accessory load group is only required to include at least one of the injector, the starter motor, the engine control unit, and the spark plug.

While the power generator is employed to generate electric power in each of the aforementioned first and second embodiments, the present invention is not restricted to this. According to the present invention, the power generator may alternatively be employed as a motor in addition to being employed to generate electric power. For example, electric power is distributed to the power generator, whereby the power generator may be employed as a starter motor or a motor configured to assist the starter motor.

What is claimed is:

1. An outboard motor boat comprising:
   a boat body;
   an engine battery and a boat accessory battery both arranged in the boat body; and
   an outboard motor mounted on the boat body, the outboard motor including
      an engine including a crankshaft,
      a power generator including
         a stator, and
         a rotor driven by the crankshaft,
      an engine accessory configured to drive the engine,
      a converting device configured to convert alternating-current power output from the power generator into first direct-current electric power,
      an engine cover configured to cover the engine, the power generator, the engine accessory, and the converting device so that the engine battery and the boat accessory battery are both external to the engine cover,
      a first electrical path configured to supply second direct-current electric power, which is based upon the first direct-current electric power, to the engine accessory, the first electrical path being capable of supplying the second direct-current electric power to the engine battery,
      a branch portion between the converting device and the engine accessory, and
      a second electrical path branched from the branch portion, and configured to be capable of supplying third direct-current electric power, which is based upon the first direct-current electric power, to the boat accessory battery so that the third direct-current electric power has a first voltage that is higher than a second voltage which is that of the second direct-current electric power.

2. An outboard motor comprising:
an engine including a crankshaft;
a power generator including
   a stator, and
   a rotor driven by the crankshaft;
an engine accessory configured to drive the engine;
a converting device configured to convert alternating-current power output from the power generator into first direct-current electric power;
an engine cover configured to cover the engine, the power generator, the engine accessory, and the converting device;
a first electrical path configured to supply second direct-current electric power, which is based upon the first direct-current electric power, to the engine accessory, the first electrical path further being capable of supplying the second direct-current electric power to a portion of the first electrical path external to the engine cover;
a branch portion between the converting device and the engine accessory; and
a second electrical path branched from the branch portion, and configured to be capable of supplying third direct-current electric power, which is based upon the first direct-current electric power, to a portion of the second electrical path external to the engine cover so that the third direct-current electric power has a first voltage that is higher than a second voltage which is that of the second direct-current electric power.

3. The outboard motor according to claim 2, wherein the first electrical path is connected to an engine battery arranged in a boat body provided with the outboard motor.

4. The outboard motor according to claim 2, wherein the engine accessory includes at least one accessory selected from the group consisting of an injector, a starter motor, an engine control unit, and a spark plug.

5. The outboard motor according to claim 2, wherein the power generator, the engine accessory, and the converting device are mounted on the engine.

6. The outboard motor according to claim 2, further comprising a step-up transformer arranged between the branch portion and the second electrical path.

7. The outboard motor according to claim 2, wherein the second electrical path is connected to a boat accessory battery arranged in a boat body provided with the outboard motor.

8. The outboard motor according to claim 7, wherein the boat accessory battery is configured to store fourth direct-current electric power, which is based upon the third direct-current electric power, and supply the fourth direct-current electric power to an electrical component arranged in the boat body.

9. The outboard motor according to claim 7, wherein the second electrical path is connected to the boat accessory battery through a step-down transformer located in the boat body.

10. The outboard motor according to claim 7, further comprising a constant voltage device provided between the branch portion and the boat accessory battery, wherein
   the boat accessory battery includes n boat accessory batteries connected in series,
   the second electrical path is connected to the n boat accessory batteries, and
   the constant voltage device is configured to transform a voltage of the first direct-current electric power into another voltage that is equal to a boat accessory battery voltage×n, and to output the third direct-current electric power so that the first voltage is the other voltage.

11. The outboard motor according to claim 2, further comprising a step-down transformer arranged between the branch portion and the engine accessory, wherein
   a voltage at the branch portion is an engine accessory voltage or higher.

12. The outboard motor according to claim 11, further comprising a step-up transformer arranged between the converting device and the branch portion.

13. The outboard motor according to claim 11, wherein the converting device is configured to output the first direct-current electric power to have a voltage which is the engine accessory voltage or higher.

14. The outboard motor according to claim 11, wherein the power generator is configured to output the alternating-current power to have a voltage that is the engine accessory voltage or higher.

15. The outboard motor according to claim 11, wherein the converting device is configured to perform field control of the power generator to control the alternating-current power output by the power generator.

* * * * *